(12) United States Patent
Allan

(10) Patent No.: US 11,907,432 B2
(45) Date of Patent: Feb. 20, 2024

(54) USER-VEHICLE INTERFACE INCLUDING GESTURE CONTROL SUPPORT

(71) Applicant: BAE Systems plc, London (GB)

(72) Inventor: Glenn David Allan, London (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 17/637,983

(22) PCT Filed: Aug. 20, 2020

(86) PCT No.: PCT/GB2020/051991
§ 371 (c)(1),
(2) Date: Feb. 24, 2022

(87) PCT Pub. No.: WO2021/044116
PCT Pub. Date: Mar. 11, 2021

(65) Prior Publication Data
US 2022/0276718 A1 Sep. 1, 2022

(30) Foreign Application Priority Data

Sep. 6, 2019 (GB) .................................... 1912841
Oct. 17, 2019 (EP) .................................... 19275095

(51) Int. Cl.
*G06F 3/0484* (2022.01)
*G06F 3/01* (2006.01)
*B60K 35/00* (2006.01)

(52) U.S. Cl.
CPC .............. *G06F 3/017* (2013.01); *B60K 35/00* (2013.01); *G06F 3/0484* (2013.01); *B60K 2370/1464* (2019.05)

(58) Field of Classification Search
CPC ...... G06F 3/017; G06F 3/0484; G06F 3/0481; G06F 3/013; B60K 35/00; B60K 2370/1464

See application file for complete search history.

(56) References Cited

U.S. PATENT DOCUMENTS

2009/0278915 A1 11/2009 Kramer et al.
2012/0105312 A1* 5/2012 Helmes ................. G06F 3/0236
345/156

(Continued)

FOREIGN PATENT DOCUMENTS

EP 3316075 A1 5/2018

OTHER PUBLICATIONS

PCT International Search Report and Written Opinion of PCT Application No. PCT/GB2020/051991, dated Oct. 30, 2020, 13 pages.

(Continued)

*Primary Examiner* — Rinna Yi
(74) *Attorney, Agent, or Firm* — Maine Cernota & Curran

(57) ABSTRACT

There is provided a user-vehicle interface, comprising a gesture control system that is arranged to: sense a direction of a gesture of a user of the vehicle; and process the sensed gesture to control a location of an indicator on a display in accordance with that sensed direction, such that a location of the indicator is arranged to move in accordance with changes in the sensed direction, the indicator being used to show a current position for user interaction with content on the display, and being in a plane in which that content resides.

19 Claims, 6 Drawing Sheets

(56) References Cited

U.S. PATENT DOCUMENTS

| | | | |
|---|---|---|---|
| 2013/0063336 A1 | 3/2013 | Sugimoto et al. | |
| 2014/0181759 A1* | 6/2014 | Kim ..................... | B60K 37/06 |
| | | | 715/863 |
| 2016/0132126 A1 | 5/2016 | Van Laack et al. | |
| 2016/0371886 A1* | 12/2016 | Thompson .............. | G06F 3/013 |
| 2019/0073040 A1 | 3/2019 | Luchner et al. | |
| 2019/0294312 A1* | 9/2019 | Rohrbacher ........ | G06F 3/04812 |

OTHER PUBLICATIONS

European Search Report Application No. 19275095.8, dated Apr. 9, 2020, 7 pages.
Great Britain Search Report Application No. GB1912841.2, dated Jul. 21, 2020, 4 pages.
International Preliminary Report on Patentability for PCT/GB2020/051991 dated Mar. 17, 2022, 9 pages.

* cited by examiner

USER-VEHICLE INTERFACE INCLUDING GESTURE CONTROL SUPPORT

RELATED APPLICATIONS

This application is a national phase application filed under 35 USC § 371 of PCT Application No. PCT/GB2020/051991 with an International filing date of Aug. 20, 2020, which claims priority of GB Patent Application 1912841.2 filed Sep. 6, 2019 and EP Patent Application 19275095.8 filed Oct. 17, 2019. Each of these applications is herein incorporated by reference in its entirety for all purposes.

FIELD OF THE INVENTION

The present invention relates generally to a user-vehicle interface, and, in particular, to an interface comprising a gesture control system usable to interact with content on a display related to the interface.

BACKGROUND OF THE INVENTION

Traditionally, user-vehicle interfaces have taken the form of physical actuators, for example flight control sticks, throttles, steering wheels, and so on, and visual aids, such as dials, displays, touch screens etc. As time has progressed, newer and arguably more intuitive interface approaches have been proposed, for example the use of eye-tracking and gesture control, and so on.

More traditional user-vehicle interfaces have advantages, such as simplicity, robustness and longevity, but also disadvantages, such as a relatively limited scope of interaction with the vehicle or a non-intuitive interaction. Whereas more recent proposals for user-vehicle interfaces have sought to avoid or overcome such disadvantages, there are nevertheless disadvantages with such more recent proposals, for example in terms of insuring that those new proposals are fit for purpose, and are generally useful, accurate and reliable, and so on.

In addition, user-vehicle interfaces are now being used in a wider variety of vehicles, ranging from cars, to boats, to aeroplanes, to helicopters, and throughout the entire range of vehicles. It is often desirable to ensure that the user-vehicle interface is tailored to the particular vehicle, or use conditions, not only in terms of look and feel, but in terms of ease of use, or particular use, of a user of that vehicle. These latter points are often ignored or overlooked in proposed implementations.

It is an aim of example embodiments or aspects of the present invention to at least partially solve, avoid or overcome one or more problems or disadvantages associated with prior art user-vehicle interfaces, whether identified herein or elsewhere, or to at least provide a viable alternative to prior art user-vehicle interfaces. Aspects and embodiments of the present invention are described in more detail herein and are more generally defined by the claims that follow.

SUMMARY OF THE INVENTION

According to a first aspect of the present invention there is provided a user-vehicle interface, comprising a gesture control system that is arranged to: sense a direction of a gesture of a user of the vehicle; and process the sensed gesture to control a location of an indicator on a display in accordance with that sensed direction, such that a location of the indicator is arranged to move in accordance with changes in the sensed direction, the indicator being used to show a current position for user interaction with content on the display, and being in a plane in which that content resides.

The gesture control system may be arranged to process the sensed gesture to control, on the display, a representation of the sensed direction, toward the current position for user interaction with the content, either as part of the displayed indicator, or in addition to the displayed indicator.

The control may be arranged such that the representation is configured to be: such that the representation appears to the user to originate from the general perspective of the user; and/or such that the representation appears to the user to originate from a general location of a body part used in the gesture; and/or such that the representation extends to the plane in which content resides.

The control may be arranged such that the representation appears to the user to originate from a general location of a hand or a pointing digit of the hand of the user, or from a virtual representation of such hand or pointing digit provided on the display.

The representation may comprise a linear representation.

The gesture control system may be arranged to sense a direction of the gesture of the user, in the form of a direction of a hand gesture, or in the form of a direction of a point of a digit of the user's hand.

The control may be such that a location of the indicator is arranged to move continuously and proportionally in accordance with changes in the sensed direction.

The control may be such that a location of the indicator is arranged to move in accordance with changes in the sensed direction, according to a scaling factor, such that: the scaling factor is substantially 1:1, such that a degree of movement of the indicator substantially equates to a degree of changes in the sensed direction; or the scaling factor is X:1, where X is greater than 1, such that a degree of movement of the indicator is greater than a degree of changes in the sensed direction; or the scaling factor is 1:X, where X is greater than 1, such that a degree of movement of the indicator is smaller than a degree of changes in the sensed direction.

The control may be such that a location of the indicator is arranged to be in alignment with the sensed direction.

The control may be such that a location of the indicator is arranged to be offset from the sensed direction.

The user-vehicle interface may further comprise an engagement input device for a user to use in order to engage with content coinciding with a location of the indicator.

The user-vehicle interface may further comprise the display, the display being arranged to be visible to the user of the vehicle, and to display content to the user.

The display may be a user, head-mounted, display; and/or a display that is fixed to or relative to the vehicle.

According to a second aspect of the present invention there is provided a user-vehicle interfacing method, comprising: sensing a direction of a gesture of a user of the vehicle; and controlling a location of an indicator on a display in accordance with that sensed direction, such that a location of the indicator is arranged to move in accordance with changes in the sensed direction, the indicator being used to show a current position for user interaction with content on the display, and being in a plane in which that content resides.

According to a third aspect of the present invention there is provided a vehicle, which: comprises the user-vehicle interface of the first aspect; and/or is configured to implement the user-vehicle interfacing method of the second aspect; and, optionally, wherein the vehicle is an aircraft.

According to a fourth aspect of the present invention there is provided a user-vehicle interface, comprising: a gesture control system, arranged to sense a gesture of a user of the vehicle; the gesture control system being arranged to process the sensed gesture to control interaction with content on a display, in accordance with that sensed gesture; and the user-vehicle interface further comprises a gesture control support, arranged to physically support a body part of the user associated with a provision of the gesture.

The user-vehicle interface may be arranged to determine if the body part is being supported, optionally using: a sensor in the gesture control support; or the gesture control system.

A degree of control facilitated by the gesture control system may be dependent on the determination, the degree of control optionally comprising: an enabling or disabling of gesture control; or a different sense-control scaling factor.

The gesture control support may be fixed to the vehicle.

The gesture control support may also be a physical actuator for controlling the vehicle.

The gesture control system may be arranged to sense a hand gesture of a user of the vehicle, and, optionally, the gesture control support is arranged to physically support a part of an arm of the user connected to that hand.

The gesture control system may be arranged to sense a direction of a gesture of the user of the vehicle; and to process the sensed gesture to control a location of an indicator on the display in accordance with that sensed direction, such that a location of the indicator is arranged to move in accordance with changes in the sensed direction, the indicator being used to show a current position for user interaction with content on the display.

The control may be such that a location of the indicator is arranged to move continuously and proportionally in accordance with changes in the sensed direction.

The control may be such that a location of the indicator is arranged to move in accordance with changes in the sensed direction, according to a scaling factor, such that: the scaling factor is substantially 1:1, such that a degree of movement of the indicator substantially equates to a degree of changes in the sensed direction; or the scaling factor is X:1, where X is greater than 1, such that a degree of movement of the indicator is greater than a degree of changes in the sensed direction; or the scaling factor is 1:X, where X is greater than 1, such that a degree of movement of the indicator is smaller than a degree of changes in the sensed direction.

The control may be such that a location of the indicator is arranged to be: in alignment with the sensed direction; or offset from the sensed direction.

The user-vehicle interface may further comprise an engagement input device for a user to use in order to engage with content coinciding with a location of the indicator.

The user-vehicle interface may further comprise the display, the display being arranged to be visible to the user of the vehicle, and to display content to the user.

The display may be: a user, head-mounted, display; and/or a display that is fixed to or relative to the vehicle.

According to a fifth aspect of the present invention there is provided a user-vehicle interfacing method, comprising: sensing a gesture of a user of the vehicle; controlling interaction with content on a display, in accordance with that sensed gesture; and physically supporting a body part of the user associated with a provision of the gesture.

According to a sixth aspect of the present invention there is provided a vehicle, which: comprises the user-vehicle interface of the fourth aspect; and/or is configured to implement the user-vehicle interfacing method of the fifth aspect; and, optionally, wherein the vehicle is an aircraft.

According to a seventh aspect of the present invention there is provided a user-vehicle interface, comprising: a gesture control system, arranged to sense a gesture of a user of the vehicle; the gesture control system being arranged to process the sensed gesture to control interaction with content on a display, in accordance with that sensed gesture; the vehicle comprising a physical actuator for controlling the vehicle, and the gesture control system is arranged to facilitate interaction with content on the display, when a body part of the user associated with a provision of the gesture is engaged with the actuator.

The user-vehicle interface may be arranged to determine if the body part is engaged with the actuator, optionally using: a sensor in the actuator; or the gesture control system.

The user-vehicle interface may be arranged to determine if a particular gesture has been made by the user.

The particular gesture may comprise a movement or a point of one or more digits of a hand of the user engaged with the actuator.

A degree of control facilitated by the gesture control system may be dependent on the determination, and, optionally, the degree of control comprises: an enabling or disabling of gesture control; or a different sense-control scaling factor.

The actuator may be fixed to the vehicle.

The gesture control system may be arranged to sense a direction of a gesture of the user of the vehicle; and to process the sensed gesture to control a location of an indicator on the display in accordance with that sensed direction, such that a location of the indicator is arranged to move in accordance with changes in the sensed direction, the indicator being used to show a current position for user interaction with content on the display.

The control may be such that a location of the indicator is arranged to move continuously and proportionally in accordance with changes in the sensed direction.

The control may be such that a location of the indicator is arranged to move in accordance with changes in the sensed direction, according to a scaling factor, such that: the scaling factor is substantially 1:1, such that a degree of movement of the indicator substantially equates to a degree of changes in the sensed direction; or the scaling factor is X:1, where X is greater than 1, such that a degree of movement of the indicator is greater than a degree of changes in the sensed direction; or the scaling factor is 1:X, where X is greater than 1, such that a degree of movement of the indicator is smaller than a degree of changes in the sensed direction.

The control may be such that a location of the indicator is arranged to be: in alignment with the sensed direction; or offset from the sensed direction.

The user-vehicle interface may further comprise an engagement input device for a user to use in order to engage with content coinciding with a location of the indicator, and optionally the engagement input device being, or being part of, the actuator.

The user-vehicle interface may further comprise the display, the display being arranged to be visible to the user of the vehicle, and to display content to the user.

The display may be: a user, head-mounted, display; and/or a display that is fixed to, or relative to, the vehicle.

According to an eighth aspect of the present invention there is provided a user-vehicle interfacing method, comprising: sensing a gesture of a user of the vehicle; and controlling interaction with content on a display, in accordance with that sensed gesture; facilitating interaction with content on the display, when a body part of the user associated with a provision of the gesture is engaged with a physical actuator for controlling the vehicle.

According to a ninth aspect of the present invention there is provided a vehicle, which: comprises the user-vehicle interface of the seventh aspect; and/or is configured to implement the user-vehicle interfacing method of the eighth aspect; and, optionally, wherein the vehicle is an aircraft.

According to a tenth aspect of the present invention there is provided a user-vehicle interface, comprising: a selection system, arranged to receive an input from a user of the vehicle, the selection system being arranged to process the input to facilitate interaction with a particular selected region of a display, in accordance with that input; and a gesture control system, arranged to sense a gesture of a user, the gesture control system being arranged to process the sensed gesture to control interaction with content on the display, in accordance with that sensed gesture; wherein the user-vehicle interface is arranged such that the gesture control interaction with content on the display is only allowed for the particular region of the display, as selected by the user.

The user-vehicle interface may be arranged such that the gesture control interaction with content on the display is only allowed for the particular region of the display, as selected by the user, in that content outside of that region cannot be interacted with using gesture control.

The user-vehicle interface may be arranged such that the gesture control interaction with content on the display is only allowed for the particular region of the display, as selected by the user, in that an indicator on the display, movable in accordance with the sensed gesture: can move outside of the selected region, but cannot interact with content outside of the selected region; or cannot move outside of the selected region, and so cannot interact with content outside of the selected region.

The region may comprise: a particular sub-area of a total display area; and/or particular content The selection system may comprise at least an eye-tracking component for receiving eye-movement based input from the user, and, optionally a confirmatory input device for confirming a region of the display as the selected region based on the eye-tracking.

The gesture control system may be arranged to sense a direction of a gesture of the user of the vehicle; and to process the sensed gesture to control a location of an indicator on the display in accordance with that sensed direction, such that a location of the indicator is arranged to move in accordance with changes in the sensed direction, the indicator being used to show a current position for user interaction with content on the display.

The control may be such that a location of the indicator is arranged to move continuously and proportionally in accordance with changes in the sensed direction.

The control may be such that a location of the indicator is arranged to move in accordance with changes in the sensed direction, according to a scaling factor, such that: the scaling factor is substantially 1:1, such that a degree of movement of the indicator substantially equates to a degree of changes in the sensed direction; or the scaling factor is X:1, where X is greater than 1, such that a degree of movement of the indicator is greater than a degree of changes in the sensed direction; or the scaling factor is 1:X, where X is greater than 1, such that a degree of movement of the indicator is smaller than a degree of changes in the sensed direction, The scaling factor may be dependent on: the size of the selected region; the location of the selected region; a type of content that the region comprises.

The control may be such that a location of the indicator is arranged to be: in alignment with the sensed direction; or offset from the sensed direction.

The user-vehicle interface of any preceding claim, further comprising an engagement input device for a user to use in order to engage with content coinciding with a location of the indicator.

The user-vehicle interface may further comprise the display, the display being arranged to be visible to the user of the vehicle, and to display content to the user.

The display may be: a user, head-mounted, display; and/or a display that is fixed to the vehicle.

According to an eleventh aspect of the present invention there is provided a user-vehicle interfacing method, comprising: receive an input from a user of the vehicle; facilitating interaction with a particular selected region of a display, in accordance with that input; sensing a gesture of a user of the vehicle; controlling interaction with content on a display, in accordance with that sensed gesture; and wherein gesture control interaction with content on the display is only allowed for the particular region of the display, as selected by the user.

According to a twelfth aspect of the present invention there is provided a vehicle, which: comprises the user-vehicle interface of the tenth aspect; and/or is configured to implement the user-vehicle interfacing method of the eleventh aspect; and, optionally, wherein the vehicle is an aircraft.

It will be appreciated that one or more features of one or more of the aspects described above can be used in combination with, or even replace, one or more features of other aspects of the invention. This is because all aspects are very closely related, and even interrelated, in terms of the user-vehicle interface involving the use of gesture control, with related benefits.

BRIEF DESCRIPTION OF THE DRAWINGS

For a better understanding of the present invention, and to show how embodiments of the same may be carried into effect, reference will now be made, by way of example, to the accompanying diagrammatic Figures in which:

FIG. 6b schematically depicts the view of a display of from the perspective of a user of the interface of FIG. 6a;

FIG. 10a schematically depicts use of the interface of FIG. 9a;

FIG. 10b schematically depicts the view of the display as seen by the user in accordance with the use of the interface of FIG. 10a;

FIG. 15c schematically depicts a different view to that shown in FIG. 15b, demonstrating alternative use of the interface of FIGS. 12a, 13a, 14a and 15a;

DETAILED DESCRIPTION

Figure 1A:
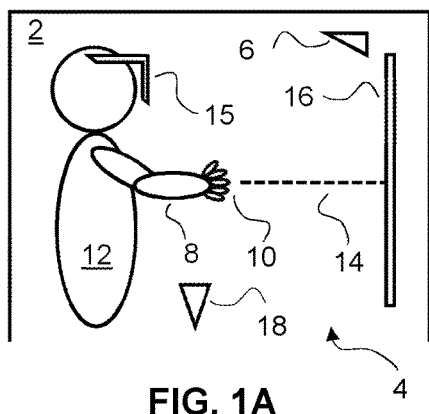
FIG. 1a schematically depicts a user-vehicle interface using gesture control to control the location of a displayed indicator, in accordance with an embodiment of the present invention.

As discussed above, it is generally desirable to provide an improved user-vehicle interface, and in particular, one that involves the use of some form of gesture control to interact with content on a display forming part of, or in connection with, that interface.

One problem with existing interfaces that involve the use of gesture control is the visualisation of any related interaction with content. For instance, some proposed implementations might involve the tracking and then visualisation of a user's appendage, such as the hand, for interacting with content on a display. However, to some extent the hand or similar is seen to float in the display, and the hand needs to be moved toward or away from content on the display in order to interact with the content, either in a more global sense, or a more precise sense, for example moving one or more digits of the user's hand toward the display to press or virtually press, a button or similar visualised in the display. Such an interface might look quite intuitive and quite impressive, but in practice can be quite difficult for a user to use. The interface is not very intuitive when actually used in practice. For instance, even though the visualisation of the user's appendage might give the user some context for interacting with content in the display, it is not at all intuitive for the user to know how far away, in a virtual sense, the displayed hand is from a plane in which the content to be interacted with resides. This means that it may be very difficult for the user to easily know how far, or not, to move their hand or their fingers or similar, to interact with the content. In other words, it may be very difficult for a user to quickly or intuitively get a sense or feel of how to interact with the content in such an environment.

According to an example embodiment, the above problems may be at least partially solved, overcome, or avoided. The present invention provides a user-vehicle interface, comprising a gesture control system. The gesture control system is arranged to sense a direction of a gesture of a user of the vehicle. That is, the system is configured to sense a direction in which a gesture extends, for example in which a hand is pointing, or a finger is pointing, or an arm is extended, and so on. The gesture control system is additionally arranged to process the sensed gesture to control a location of an indicator on a display in accordance with that sensed direction, and this is such that a location of the indicator is arranged to move in accordance with changes in the sensed direction. The indicator is used to show a current position for user interaction with content on the display, for example in the form of a pointer, or cursor, and so on. Key is that the indicator is in a plane in which the content resides. Although this might seem like a seemingly trivial change from proposed systems, the change is advantageous and powerful. The change immediately removes all of those disadvantages described above, while at the same time still allowing the intuitive and precise interaction with content using gesture control. As discussed below, the indicator located in a plane in which the content resides can be used in addition with other visualisations, for example other representations such as a user's hand and so on.

FIG. 1a schematically depicts an implementation of the embodiment described above. A vehicle is schematically shown, for example in the form of a cabin or cockpit of the vehicle 2. A user-vehicle interface 4 is also depicted. The user-vehicle interface 4 comprises a gesture control system 6. The gesture control system 6 works by optically or visually sensing or detecting movement of appendages of a user, distinct from eye tracking. The gesture control system 6 is arranged to sense a direction of a gesture 8, 10 of a user 12 of the vehicle 2. The gesture may be, for instance, an extension of the user's 12 arm 8 and/or hand 10, and a direction of the gesture 14 be the direction in which the arm 8 and/or hand 10 generally extends 14 (e.g. which way the appendage is pointing, or aligned, and so on).

The user 12 may view content to be interacted with on a display, and the display could take the form of a user, head-mounted display 15, and/or a display 16 that is in some way fixed to the vehicle 2. A head-mounted display 15 may be convenient in terms of allowing the user 12 to enjoy a more immersive and perhaps more easily augmented interface experience. A more traditionally fixed display 16 may be easier to implement or may serve as more of a focal point for interacting with the vehicle 2. A combined system might also be employed, for example with a head-mounted display 15 providing user-specific content or augmentation, and a fixed display 16 displaying common content.

There may be provided a head-mounted display 15 which is configured to present to the user an augmented display, appearing fixed relative to the aircraft as a fixed display might, but being visible only though the head-mounted display.

In some examples, the user-vehicle interface 4 may comprise a display for displaying content that the user 12 is to interact with. However, the user-vehicle interface could be a stand-alone system which is retro-fitted to vehicles with existing displays or similar.

The gesture control system, or interface in general, might control a display to process content for display (including gesture-based indications), or the gesture control system, or interface in general, might process content and send signals to the display, for displaying.

The user-vehicle interface 4 may additionally comprise an engagement input device 18, for example for use by the user in engaging with content by the gesture control system 6. This might involve confirming that content is to be engaged with, or controlling an aspect of the interaction with the content.

Figure 1B:
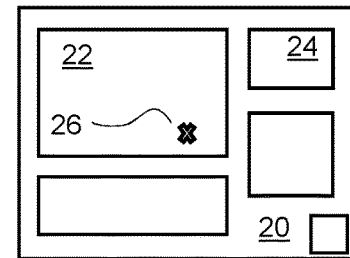
FIG. 1b schematically depicts a view of a display as viewed by the user of the interface of FIG. 1a using gesture control to control the location of a displayed indicator, in accordance with an example embodiment.

FIG. 1b schematically depicts the view of the user 12 when using the user-vehicle interface 4. A display area 20 is generically shown, together with particular regions 22, 24 of the display area 20. These regions 22 could be particular areas (e.g. tiles) of the display area 20, and/or particular content to be interactive with by the user 12, for example icons or menus, or sub-displays.

As discussed above, the gesture control system 6 is arranged to control a location of an indicator 26 in the display area 20, in accordance with the sensed direction of the gesture of the user 12.

Figure 2A:
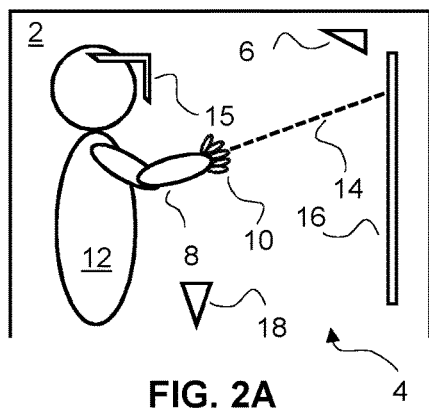
FIGS. 2a and 2b show use of the interface and displays of FIGS. 1a and 1b, in accordance with example embodiments.
Figure 2B:
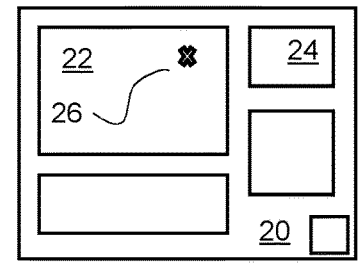

As shown in FIGS. 2a and 2b, where the direction of the gesture has changed, it can be seen in FIG. 2b that the location of the indicator 26 is arranged to move in accordance with changes in the sensed direction. Importantly, the indicator 26 is located in the same plane in which content to be interacted with resides. This means that it is easier and more intuitive for the user to enjoy the benefits of gesture control, but at the same time to more quickly and easily see, appreciate and understand how that gesture control is being visualised in a display, and in relation to content to be interacted with. The user does not have to obtain a sense or feel of how far a floating visualisation is from the plane of the content.

The indicator is already in the plane. Of course, there could be multiple planes of contact, and in this case it would be possible to select which plane is to be interacted with, and in which place the indicator is to be shown.

Figure 3A:
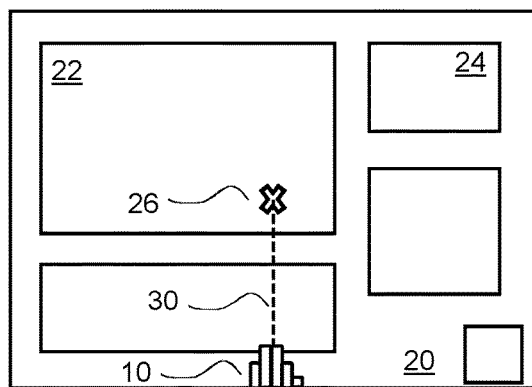
FIGS. 3a and 3b schematically depict alternative implementations of the displays shown in FIGS. 1b and 2b, respectively, in accordance with example embodiments.
Figure 3B:
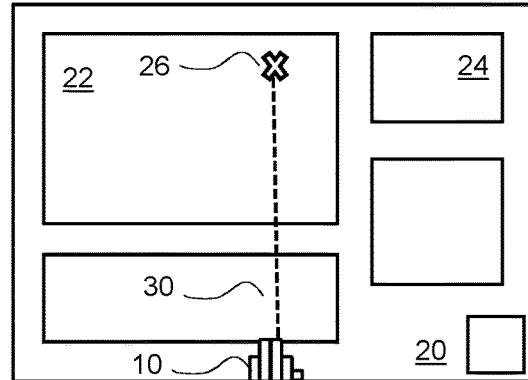

While FIGS. 1a and 2a show a direction 14 in which the gesture 8, 10 extends, it is to be noted that the actual views of the display by the user 12, as shown in FIGS. 1b and 2b do not actually show this extension direction 14. Instead, those views show only the indication of changes in the direction, in the plane in which content resides. FIGS. 3a and 3b generally correspond to the views shown in FIGS. 1b and 2b, but now show 30 that the gesture control system is additionally arranged to process the sensed gesture to control, on the display, a representation of the sensed direction, toward the current position for user interaction with the content (i.e. the indicator 26). This could be additionally or alternatively defined or described as being part of the displayed indicator 26, or in addition to the displayed indicator 26. In other words, this might be viewed as a visual wand or similar, particularly when the representation 30 is a linear representation or similar. This may more visually guide the user to where the indicator 26 is located, or generally to where content to be interacted with is located, while still enjoying the benefits of the in-plane indicator discussed above.

FIGS. 3a and 3b show that the representation 30 might conveniently appear to the user to originate from the general perspective of the user. This might be a more visually comfortable and intuitive implementation, allowing the user to more easily and conveniently interact with their content from their own visual perspective.

FIGS. 3a and 3b show that more particularly, representation 30 might appear to the user to originate from a general location of a body part used in the implementation of the gesture, for example their arm, or hand 10 (which includes the visual and virtual representation of such on the display 20). Again, this might be an even more visually comfortable and intuitive implementation, allowing the user to more easily and conveniently interact with their content from their own visual perspective.

Figure 4A:
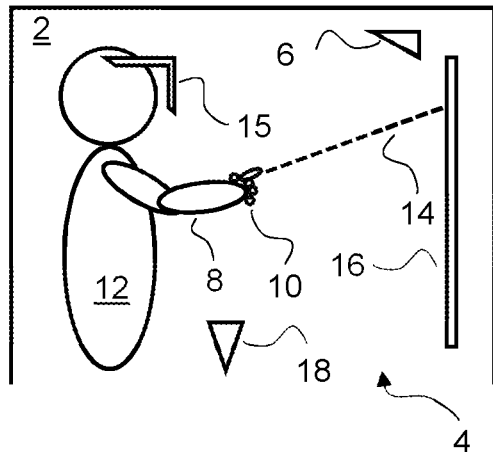
FIGS. 4a and 4b schematically depict a more particular implementation of the embodiments already shown in and described with reference to FIGS. 1a to 2b.
Figure 4B:
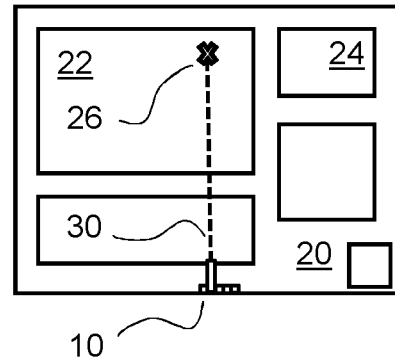

While use of a direction of extension of a user's hand may be an intuitive way for indicating a direction or desired interaction with content on a display, an even more intuitive implementation is to use the point of a digit of the user's hand, which is of course commonly used to indicate a direction for interaction in the everyday world. FIGS. 4a and 4b show such an implementation, where the direction of a pointing gesture is used to determine the location and movement of a displayed indicator 26, and an associated representation of the sensed direction 30 from the user's hand 10.

In FIGS. 1 to 4, the displayed indicator 26 is shown as moving continuously and proportionally in accordance with changes in the sensed direction. This is particularly intuitive, since the indicator then serves as a real-time and live pointer for user interaction. In an alternative, however, the movement of the indicator may not necessarily be continuous, and could be step-wise, or discrete, for example moving from display region to display region, or from content to content. In some ways, this may not be as intuitive as the continuous implementation. However, in other examples, this may be an advantageous implementation, since this might improve the speed with which content can be navigated or interacted with, or the precision with which content can be navigated and interacted with. This may be particularly the case when the vehicle is not moving smoothly but is moving or bouncing around or turning sharply and so on, where it may be difficult to accurately and precisely move the displayed indicator 26 in such circumstances. However, and again, continuous and proportional movement is likely to be a more intuitive way of interacting with display content.

Also as shown in FIGS. 1 to 4, is that displayed movement of the indicator is shown as being directly proportional to sensed changes in direction of the gesture. That is, a scaling factor of 1:1 is applied, such that a degree of movement of the indicator on the display substantially equates to a degree of changes in the sensed direction. Again, this may be particularly intuitive and logical for a user, since this equates to a real-world pointing or gesturing environment, where, for example, movement of a laser pointer by 90° would result in movement of the displayed laser point by 90°, and so on. However, other, related implementations may be advantageous for different reasons. For instance, movement of the gesture may be more limited than the display area that is available. For instance, it may well be that movement of a user's hand or finger or other digit is relatively restricted, when there is a far wider scope for interaction with a larger physical or virtual display area. In this case, it might well be that a scaling factor is applied of X:1, where X is greater than 1, such that the degree of the movement of the indicator on the display is greater than a degree of changes in the sensed direction of the input gesture. In other words, the input gesture is to some extent magnified in terms of how related movement of the indicator is displayed. While this might be useful for situations where the input gesture is restricted in terms of freedom of movement, this might also be advantageous in terms of simply more quickly or crudely interacting with the display. Conversely, the opposite may be true, where a scaling factor is applied of 1:X, where X is greater than 1, such that a degree of movement of the indicator as displayed, is smaller than a degree of changes in the sensed direction. This implementation might be useful where more refined control is required, for example where content is more tightly grouped, or where content to be interacted with is smaller on the display. Additionally, or alternatively, this implementation might be useful simply when less input sensitivity is required, for example when the vehicle is moving in an environment in which smooth travel is not likely, or is not experienced, for example due to a bumpy road surface, turbulent air travel, sharp turns, etc. In this situation, it might be highly desirable for the gesture control to actually not equate to the user input, but to be a less sensitised version of that input. This might reduce or avoid gesture control moving the on-screen indicator unintentionally around the display area, or unintentionally away from desired content, or, in a related manner, to interacting with unintentional content, and so on. For instance, this might avoid or reduce a jittery input.

Even when input is proportional, or scaled up or down, a degree of smoothing may be applied, to avoid jitter, or unintentional (relatively high frequency) movement of the indicator.

In FIGS. 1 to 4, the indicator displayed on the screen is shown as being aligned with the sensed gesture direction. Again, this is intuitive, and mimics a real-world environment, such as use with a laser pointer or similar. Therefore, this implementation is both comfortable for the user, and is easy to visually and cognitively process. However, in other implementations, this implementation may not be desirable, or practical. For instance, it might well be that the user's input gesture is restricted in terms of its movement extent or direction. For instance, a user my only be able to move their hand or finger or other digits to a limited extent, and a sensed movement direction in no way corresponds to or aligns with the location of a display. Nevertheless, the above implementation can still be utilised, and usefully so. In this situation, the location of the indicator as displayed may be arranged to be offset from the sensed direction of the input gesture, so that the user does not, for example, need to physically point at the display to be interacted with, in order to interact with that display.

In order to interact with content, the user may use the engagement input device as shown in and described with reference to FIGS. 1a. The device 18 could be anything which allows the user to input to the user-vehicle interface 4, and could be a physical button, a microphone, a camera, an eye-tracking system, a touch screen or pad, and so on. In some implementations, the input device could indeed be or form part of, or be in connection with, the gesture control system 6, with for example a particular gesture or duration of gesture, indicating that content is to be interacted with in some particular way.

It will be appreciated that a new vehicle could be constructed or otherwise fabricated and incorporate the user-vehicle interface described above. Alternatively, the user-vehicle interface could be retro fitted or similar to existing vehicles, in order to upgrade or change the functionality of such a vehicle.

While the vehicle could be any particular vehicle, it is thought that a vehicle of particular interest is an aircraft, and in particular a fast-jet. These particular vehicles have somewhat unique operating principles which mean that the above-described user-vehicle interface is very well suited to application in such vehicles. For instance, aircraft and particularly fast-jets require a large degree of user-interaction, often in quick time, with a high degree of precision, and under extreme circumstances, such as for example extreme G-forces, or air turbulence or even combat. At the very same time, and for very similar reasons, the interface needs to be extremely user-friendly, responsive and intuitive. Further, operators of aircraft tend to be provided with head-mounted apparatus (e.g. helmets, microphone and speaker sets, breathing apparatus) and so the provision of a head-mounted display should be acceptable. Therefore, the above user-interface may find very useful implementation in vehicles such as aircraft and fast-jets in particular.

Figure 5A:
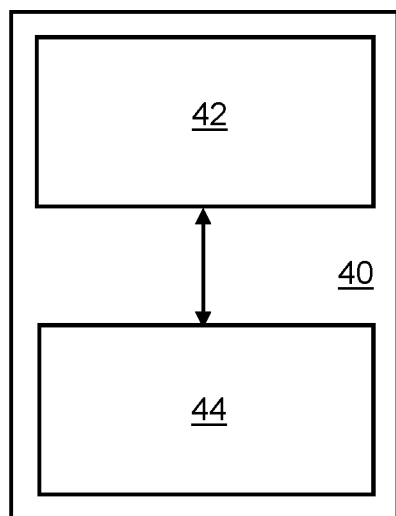
FIG. 5a schematically depicts general apparatus principles associated with a user-vehicle interface according to example embodiments.

FIG. 5a schematically depicts general apparatus-like principles associated with an example embodiment as described above. A user-vehicle interface 40 is shown. The user-vehicle interface comprises a gesture control system 42 that is arranged to sense a direction of a gesture of a user of a related vehicle. The gesture control system is arranged to process a sensed gesture to control a location of an indicator on a (connected or connectable) display 44 in accordance with that sensed direction, such that a location of the indicator is arranged to move in accordance with changes in the sensed direction, the indicator being used to show a current position for user interaction with content on the display, and being in a plane in which that content resides.

Figure 5B:
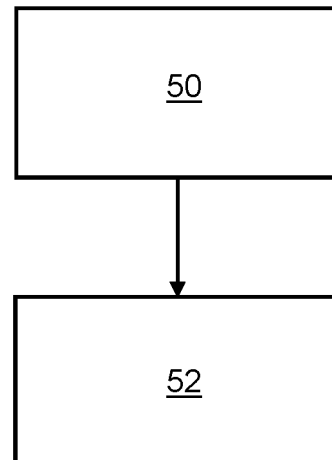
FIG. 5b schematically depicts general methodology of user-vehicle interfacing, according to example embodiments.

Similarly, FIG. 5b depicts general methodology principles associated with the embodiments described above. FIG. 5b shows that the methodology comprises sensing a direction of a gesture of a user of a vehicle 50. Then, the method comprises controlling a location of an indicator 52 on a display in accordance with that sensed direction, such that the location of the indicator is arranged to move in accordance with changes in the sensed direction, the indicator being used to show a current position for user interaction with content on the display, and being in a plane in which that content resides.

To avoid any doubt, the aspects and embodiments of this invention are interrelated, as is clear from a reading of the disclosure. Therefore, advantages and functionalities of features described in one aspect, apply at least equally to other aspects and embodiments.

As already alluded to above, and related to those embodiments, the use of gesture control of a vehicle will likely be dependent on movement of the vehicle, or movement of the user within the vehicle, at least to some extent. In proposed gesture control systems, one or more body parts associated with provision of a gesture (e.g. the appendage or part thereof, or a related or proximate appendage or similar) is entirely unsupported. For a single, or one-off, or sporadic, input gesture, this is likely to be entirely satisfactory. For instance, turning on a multi-media entertainment system may require only a single interaction per journey in a vehicle. Increasing or decreasing volume may require a limited number of interactions during a journey or use of a vehicle. However, it is envisaged that gesture control will form a greater part of interaction with a vehicle as technological advancements take place. This will involve far more frequent and longer-term gesture control interactions with vehicles. When body parts associated with gesture control are used in such environments, it is entirely likely, if not certain, that such body parts will tire very quickly. Clearly this is undesirable in terms of inducing user fatigue in general, but could also be potentially risky in terms of the user controlling the vehicle in general, or in terms of the user reliably using the gesture control interface over a period of time, or over a prolonged number of engagements or interactions. These interactions might involve the movement of an on-screen indictor or similar, as described above, or be more generally applicable to more wider gesture control which may not involve on-screen indication or visualisation, or at least not with an on-screen indicator.

The present invention provides embodiments that solve, overcome or avoid the problems of the prior art. The present invention provides a user-vehicle interface, comprising a gesture control system. The gesture control system is arranged to sense a gesture of a user of the vehicle. This might not necessarily be a direction of a gesture of a user, as described above, but a gesture in general. The gesture control system is additionally arranged to process the sensed gesture to control interaction with content on a display, forming part of or in some way in connection with the user-vehicle interface, in accordance with that sensed gesture. Key is that the user-vehicle interface further comprises a dedicated gesture control support. The gesture control support is arranged to physically support a body part of the user associated with a provision of the gesture, when the gesture is being provided. Whilst this might seem like a trivial modification to existing or proposed gesture control systems, the implementation is extremely advantageous and powerful. With a simple change, the gesture control system is immediately less tiring for a user to use. At the same time, the support provides input stability for the gesture control, meaning that the input gestures are provided more accurately, more reliably and more consistently, and generally as intended. All this improves the interaction with desired content, and this also limits or avoids the risk of engaging with unintended content.

Figure 6A:
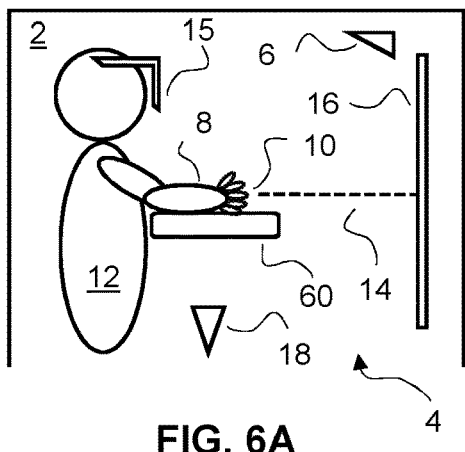
FIG. 6a schematically depicts a user-vehicle interface incorporating a gesture control support, in accordance with an example embodiment.
Figure 6B:
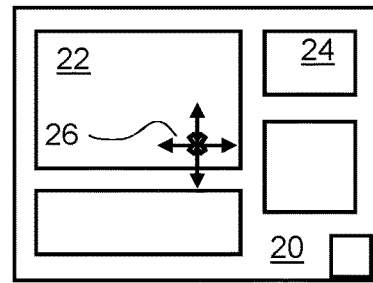

FIGS. 6a and 6b schematically depict much the same vehicle 2 and user-interface 4, and related display principles, as already shown in and described with reference to FIGS. 1a and 1b. In contrast, however, there is now provided a dedicated gesture control support 60. This may take the form of a dedicated arm rest, or dedicated wrist support or so on, which the user can engage with and generally be supported by when the control gesture is being made or being input to the interface 4.

FIG. 6b generally shows that a resulting on-screen displayed indicator 26 may for example be controlled more accurately, reliably or consistently as a result of the presence and use of the support 60. Similarly, gesture control implemented when engaged with the support 60 may be undertaken in a more relaxed manner, and certainly in a manner which results in less tiredness to the user over a period of time of gesture input, or over a prolonged number of input gestures.

The user-vehicle interface 4 may be provided such that the support 60 plays a somewhat passive role in the interface 4. However, the interface may be more usefully implemented if and when the interface 4 is arranged to determine if the body part associated with the gesture input is actually being supported. This determination may be used in more accurate or refined control or implementation of the interface as a whole. For instance, the gesture control support 60 may, itself, be able to sense or otherwise detect when a body part, and even the correct body part, is engaged with that support 60, for example by way of an embedded sensor or similar. Alternatively or additionally, the gesture control system 6 itself may be unable to undertake this determination, via one or more visual cues or measurements that would typically be undertaken in gesture control anyway.

Such active determination of whether the support is being used or engaged with may allow for, for example, a degree of control facilitated by the gesture control system 6 to be dependent or otherwise linked to that determination. Again, this might give more active control of the interface, or the vehicle, based on said determination. For instance, the degree of control might optionally comprise enabling or disabling of gesture control based on the determination. This could be for safety reasons, or simply user convenience. Particularly in environments when movement of the vehicle could be quite violent or dramatic, it may simply be known or predicted in advance that it is impossible to accurately and or safely control interaction with content associated with vehicle interaction, using gesture control, unless and until body parts associated with the gesture control are sufficiently supported.

Or, in a related manner, the determination may result in a different sense-control scaling factor being implemented. For instance, this might mean that gesture control is always allowed, but the degree of sensitivity of the input-output of the gesture control is based on whether or not the one or more body parts associated with gesture control are supported by the gesture control support. For instance, the more sensitive gesture control may only be allowed when it is determined that the body parts are being supported by the support, and less sensitive control when no such of determination is made. Or even the opposite implementation, depending on how the system is used. This relates to the scaling fact as described above in relation to a degree of movement of an on-screen indicator being equal to, greater than, or less than, changes in a sensed direction of sensed input gesture or similar.

Figure 7A:
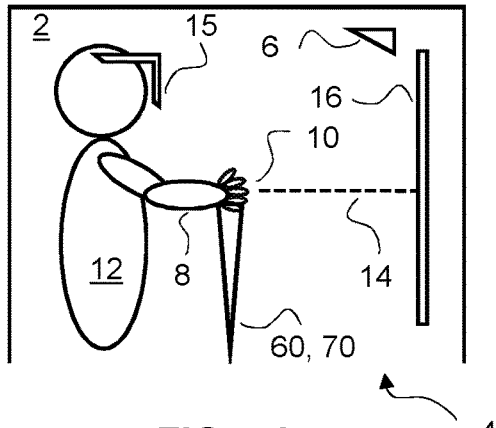
FIGS. 7a and 7b schematically depict a slightly modified version of the embodiments already shown in and described with reference to FIGS. 6a and 6b.

In one example, the gesture control support might not be fixed to the vehicle. For instance, the support might be fixed to or abut against the user in some way, and involve one or more straps or attachments to a different body part of the user which is perhaps less mobile, or less likely to move, than the body part that is involved in the input gesture. This may allow the support to be carried around by the user or even form part of a suit or similar worn by the user in operation of the vehicle or user-vehicle interface. However, it is likely that it would be better for the gesture control support 60 to be fixed to the vehicle. This would then likely mean that the body parts of the user moved in synchronisation with the vehicle, with the exception of any dedicated gesture made by the user. This should then mean that any dedicated gesture made by the user is intended for gesture control, rather than being unintended, or being a poorly implemented gesture control. FIG. 7a shows that this situation might be conveniently realised by implementing the support 60 as something which already functions as a physical actuator 70 for controlling the vehicle 2. This is because the physical actuator 70 will not only then function as a physical actuator but will also then function as the gesture control support, and will therefore perform two functions in one piece of apparatus. This means that functionality is increased, but space or costs are either not increased, or not considerably increased. For instance, the physical actuator 70 could be a flight control stick, a throttle, a steering wheel, a gear stick, and so on. As discussed above, the gesture input does not necessarily need to involve a user waving their hands or arms around and about the vehicle but could involve simply pointing of a digit or so. Thus, the use of an actuator 70 as the support 60 would perhaps even allow use of the actuator in parallel with gesture control, or at least in rapid succession.

Typically, and advantageously, it is likely that an input gesture might involve the use of a user's hand, or digits of that hand, since this is intuitive for a user, particularly with regard to pointing at a particular content for interaction on a display or similar. In this case, the gesture control support is then typically arranged to physically support a part of an arm of the user connected to that hand, for example a wrist, or forearm, or similar.

Figure 7B:
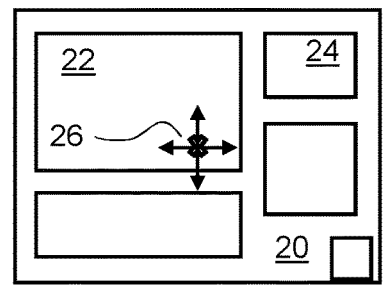

FIG. 7b is the same as FIG. 6b, and shows that the use of the support 60, in this case via the actuator 70, is improved as discussed above.

Figure 8A:
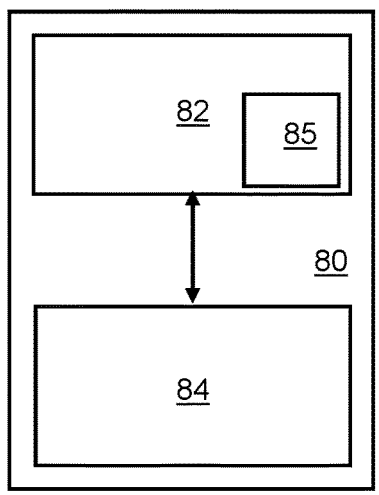
FIG. 8a schematically depicts general apparatus principles associated with a user-vehicle interface according to example embodiments.
Figure 8B:
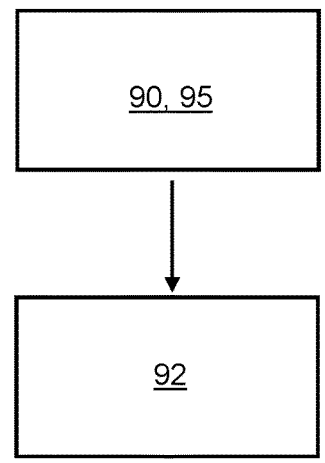
FIG. 8b schematically depicts general methodology of user-vehicle interfacing, according to example embodiments.

FIG. 8a schematically depicts general apparatus-like principles associated with an example embodiment as described above. A user-vehicle interface 80 is shown. The user-vehicle interface comprises a gesture control system 82 that is arranged to sense a gesture of a user of the vehicle. The gesture control system is arranged to process the sensed gesture to control interaction with content on a display 84, in accordance with that sensed gesture. The user-vehicle interface further comprises a gesture control support 85, arranged to physically support a body part of the user associated with a provision of the gesture Similarly, FIG. 8b depicts general methodology principles associated with the embodiments described above. FIG. 8b shows that the methodology comprises sensing a gesture of a user of a vehicle 90. Then, the method comprises controlling interaction with content on a display 92, in accordance with that sensed gesture 92. The method also involves physically supporting a body part of the user associated with a provision of the gesture 95.

As discussed above, in recent times user-vehicle interfaces have transitioned from more traditional interfaces involving the use of physical actuators and displays etc., to more advanced interfaces involving the use of eye-tracking and gesture control. However, whereas more traditional user-vehicle interfaces have limitations, it is not always yet practical, possible or desirable to have a user-vehicle interface which is free of physical actuators for controlling a vehicle. This may be due to safety concerns or standards, or simply due to the fact that typical users or consumers are not yet wiling or able to comfortably operate a vehicle without such physical actuators. A problem then, is how to transition between, or enjoy the benefits of, both traditional and physical actuators, and more modern and recent gesture-control interfaces, while at the same time keeping at least some of the benefits of both approaches.

Embodiments of the present invention solve, overcome, or avoid problems of the prior art. According to the present invention, there is provided a user-vehicle interface. The interface comprises a gesture control system, arranged to sense a gesture of a user of the vehicle. The gesture control system is arranged to process the sensed gesture to control interaction with content on a display, for example forming part of or being in connection with the interface, all in accordance with that sensed gesture. The vehicle additionally comprises a physical actuator for controlling the vehicle. The gesture control system is arranged to facilitate interaction with content on the display, when a body part of the user associated with a provision of the gesture is engaged with the physical actuator. Put simply, this allows for a multi-modal input environment, which powerfully and advantageously supplements the more traditional use of the physical actuator. The actuator might also provide support for a body part involved in the gesture input, improving input accuracy, or reducing input fatigue.

Figure 9A:
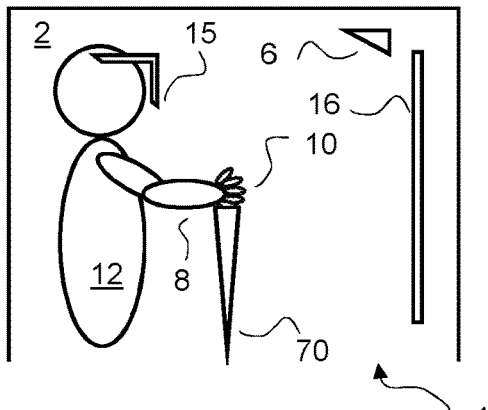
FIG. 9a schematically depicts a user-vehicle interface incorporating gesture control in combination with a physical actuator of a vehicle, in accordance with an example embodiment.
Figure 9B:
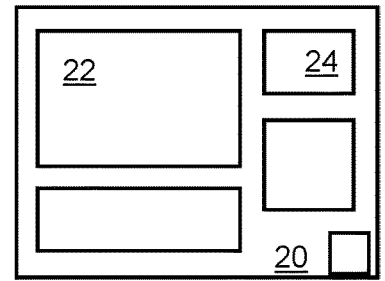
FIG. 9b schematically depicts a view of a display by the user of the interface of FIG. 9a, in accordance with an example embodiment.

FIG. 9a schematically depicts much the same user interface 4 as already shown in and as described with reference to FIG. 7a. FIG. 9b shows the display as viewed by the user 12. In this interface environment, one of two things may be possible. In one environment, the user 12 may be engaged with the actuator 70 and, at the same time be able to use gesture control with the same body part or series of body parts engaged with the actuator 70, in order to control interaction with on-screen content in the display 20. This may be advantageous, as described above, in terms of the multi-modal input. Alternatively, such gesture control may not be permitted until a gesture control mode is in some way initiated. This latter example might limit or avoid the risk of gesture control being inadvertently used to engage with content on the display when the same body parts of the user are being used to move or otherwise engage with the actuator 70.

Figure 10A:
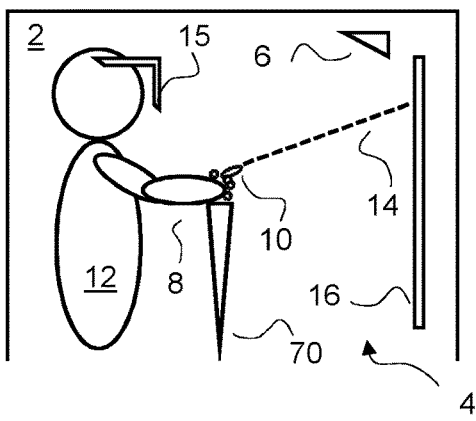

In order to avoid or overcome some of the problems in the preceding paragraph, where gesture control is inadvertently or intentionally implemented or utilised, the interface 4 may be arranged to determine if the body part used in a gesture control is engaged with the actuator 70. This may be implemented using a sensor or similar in the actuator 70, or via the gesture control system itself visually or optically sensing such engagement. Alternatively or additionally, interface 4 may be arranged to determine if a particular gesture has been made by the user, for example such as a convenient gesture in the form of a movement or a point of one or more digits of a hand of the user 10 engaged with the actuator 70, as shown in FIG. 10a.

Figure 10B:
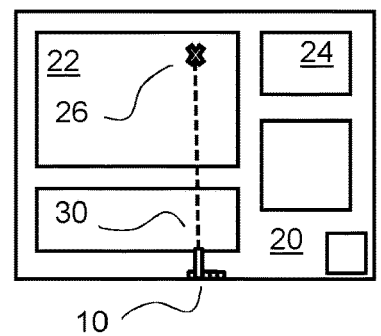

As alluded to above in different embodiments, a degree of control facilitated by a gesture control system may be dependent on the determination discussed above. This might improve safety or simply user interaction with the interface or vehicle. For instance, the degree of control might comprise enabling or disabling of gesture control, or implementation of a different sense-control scaling factor. For instance, FIG. 10b shows that when a determination is made that a particular gesture has been made (e.g. a point) or that the actuator has been engaged with by the user, a gesture control mode may be engaged or fully engaged, such as for example that already shown in and described with reference to FIG. 4b above.

As with all embodiments described herein, the aligned or offset gesture control, or the scaling factors, and so on, apply equally to this embodiment. Importantly, it may at first be assumed that it would be practically impossible to employ a useful gesture control system at the same time as the same body part is engaged with a physical actuator, fixed to a vehicle. However, this is not the case. For instance, and in a simplistic implementation, the gesture does not need to be particularly complex or wide-ranging in terms of its subtleties or range of movement. For example, a simple flick of a finger could be used to initiate indicators of turning direction in a car, or to increase or lower volume of a multi-media sound system, or to swipe left or right in a multi-media display, or to turn on or off a sub-system of some kind. In a more advanced system, and as described above, the movement of one or more digits, or even part of the hand, can be used to control displayed or on-screen indicators, particularly with use of the scaling factors or offset principles discussed above.

It is also worth noting that in these embodiments, where a physical actuator is being engaged with, the physical actuator could be even more advantageously used, in being used not only to control for example a speed of a vehicle, or the direction of travel of a vehicle, but be used to confirm content to be engaged with via the gesture control. For example, this might supplement or replace the engagement input device of previous embodiments. In other words, the engagement input device could be part of, or simply be, the physical actuator, or the physical actuator could be part of, or simply be, the engagement input device.

As in any embodiment, the gesture control mode may always be on, or selectively deactivated using the gesture control system itself (e.g. by a startup or shutdown gesture) or via a coupled or connected system.

Figure 11A:
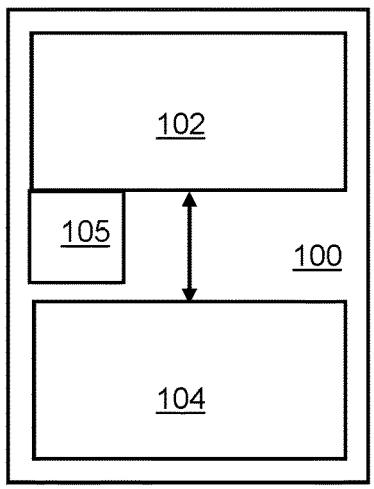
FIG. 11a schematically depicts general apparatus principles associated with a user-vehicle interface according to example embodiments.

FIG. 11a schematically depicts general apparatus-like principles associated with an example embodiment as described above. A user-vehicle interface 100 is shown. The user-vehicle interface comprises a gesture control system 102 that is arranged to sense a gesture of a user of a related vehicle. The gesture control system 102 is arranged to process the sensed gesture to control interaction with content on a display 104, in accordance with that sensed gesture. The vehicle comprises a physical actuator 105 for controlling the vehicle, which may or not be part of the, or the same, user-vehicle interface 100. The gesture control system 102 is arranged to facilitate interaction with content on the display, when a body part of the user associated with a provision of the gesture is engaged with the actuator 105.

Figure 11B:
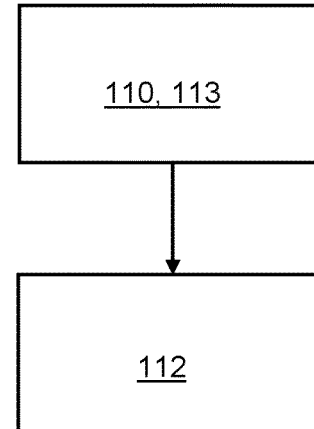
FIG. 11b schematically depicts general methodology of user-vehicle interfacing, according to example embodiments.

Similarly, FIG. 11b depicts general methodology principles associated with the embodiments described above. FIG. 11b shows that the methodology comprises sensing a of a gesture of a user of a vehicle 110. Then, the method comprises controlling interaction with content on a display, in accordance with that sensed gesture 112. The method also involves facilitating interaction with content on the display, when a body part of the user associated with a provision of the gesture is engaged with a physical actuator for controlling the vehicle 113.

In related scenarios, while gesture control may be advantageous, it may be difficult or impossible for the user, or indeed the interface, to know which part of a display, or related content, is to be interacted with in accordance with a sensed gesture. For instance, in more advanced systems, gesture control is likely to extend beyond a simple on-off command, and is likely to involve far more sophistication, either in terms of the gesture control itself, or the wide range of content that can be interacted with in accordance with such gesture control. At the same time, it may not always be possible to reliably, consistently and accurately provide gesture control, and it may be too easy to inadvertently move away from desired content, or move towards undesired on unintentional content, reducing the degree of user convenience, or even increasing the risks associated with control of the vehicle in such an environment. Finally, the extent of the display, or the range of content in such a display, may be too large or too complex to comfortably navigate and interact with using gesture control alone.

Embodiments of the present invention solve, overcome or avoid the disadvantages described above. According to the present invention, there is provided a user-vehicle interface. The interface comprises a selection system, arranged to receive an input from a user of the vehicle. The selection system is arranged to process the input to facilitate interaction with a particular selected region of a display, in accordance with that input. The interface additionally comprises a gesture control system arranged to sense a gesture of the user. The gesture control system is arranged to process the sensed gesture to control interaction with content on the display, in accordance with that sensed gesture. Key, here, is that the user-vehicle interface is arranged such that the gesture control interaction with content on the display is only allowed for the particular region of the display, as selected by the user. This implementation has a number of benefits. Firstly, using the first selection to identify a region for interaction with gesture control means that the first region can be selected in one of a number of different ways allowing flexibility in selection of that region. Gesture control can then be implemented for that region. This might mean that for a large or complex display, a particular region can be more easily selected than might be the case with gesture control alone. Also, gesture control is not only or just initially coupled or centred on the selected region but is only allowed for (e.g. within, on, or in) that region. This means that gesture control can be tailored for that region. For example, offsets or scaling factors can be applied for that region, and gesture control outside of that region is not allowed. This means that for either convenience, or safety, only gesture control in that region is acted upon, and content or otherwise outside of that region cannot be interacted with. This might avoid inadvertent or unintentional interaction with unintended or undesirable content, which might be particularly the case in vehicular environments where movement of the vehicle is sudden or violent or unexpected.

Figure 12A:
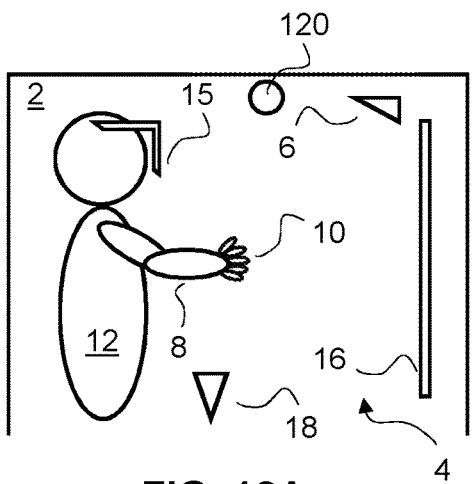
FIG. 12a schematically depicts a user-vehicle interface incorporating display region selection by a user, and subsequent gesture control bound or tied to that region, in accordance with an example embodiment.
Figure 12B:
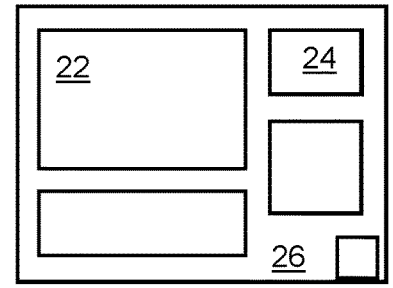
FIG. 12b schematically depicts a view of a display of the user of the interface of FIG. 12a, in accordance with an example embodiment.

FIG. 12a schematically depicts much the same vehicle 2 and user-vehicle interface 4 as shown in and described with reference to FIG. 1a. FIG. 12a shows the additional presence of a selection system 120, arranged to receive an input from a user 12 of the vehicle 2, and to process the input to facilitate interaction of the particular set or region of a display, in accordance with that input. In other examples, this selection system 120 could be part of, or be, the engagement input device 18, or an actuator of the vehicle, or so on, or even part of the gesture control system itself 6. FIG. 12b shows much the same view of a display as already shown in and described with reference to FIG. 1b although, at this stage, without the presence of a visual indicator on the display.

The selection system 120 could take one of a number of different forms, ranging from eye-tracking (including gaze detection), voice control, a physical actuator, or even a (e.g. crude) form of gesture control, such as head tracking or similar. Advantageously, the selection system comprises an eye-tracking component for receiving eye-movement based input from the user 12. This allows the user to quickly, readily and intuitively look around the vehicle and associated displays and focus on and select a particular region for interaction. The selection system 120 might comprise a confirmatory input device for confirming a region of the display as the selected region based on the eye-tracking. This could be a dedicated input device or could be part of the eye-tracking components, or part of the engagement input device 18, or physical actuator of previous embodiments, audio input, and so on. There could even be a timing element built into the system, such that if particular region or content is looked at for a particular time (e.g. gazed at) then that region is determined as being the selected region.

Figure 13A:
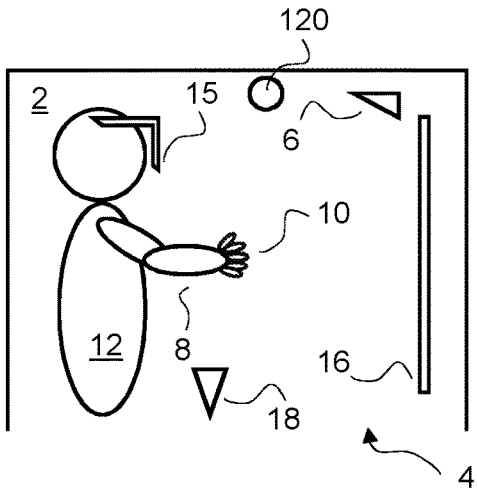
FIGS. 13a and 14a schematically depict exemplary use of the interface of FIG. 12a, with FIGS. 13b and 14b showing views of the display from the perspective of the user during such use.
Figure 13B:
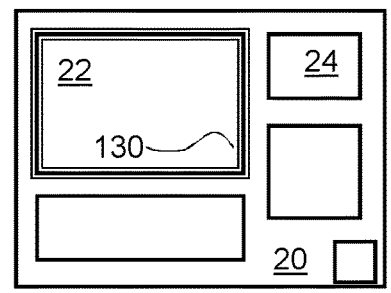

FIGS. 13a and 13b then show that, after selection, a particular region 130 of a total area 20 is selected for gesture control. The particular region 130 could be visually highlighted as being selected. This could be achieved by making this region more prominent in some way, or in making other regions less prominent. This includes making the other regions not visible at all.

Figure 14A:
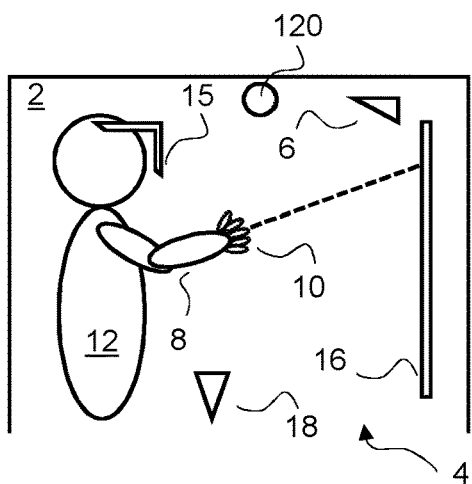
Figure 14B:
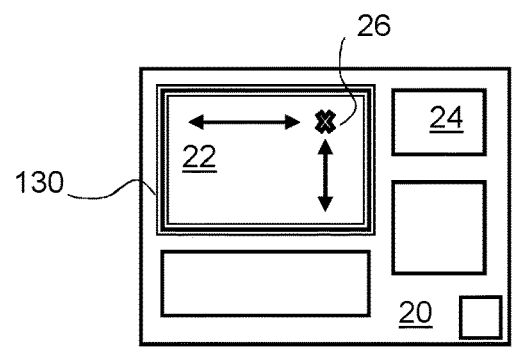

FIGS. 14a and 14b are much the same as the situation shown in and described with reference to FIGS. 2a and 2b. That is, a gesture control mode is now implemented. However, in FIGS. 14a and 14b, a key difference is that the gesture control is only and solely allowed for the selected region 130. This means that content outside of that region cannot be interacted with using the gesture control. This latter functionality can be implemented in one of a number of different ways, for example by allowing the visual indicator 26 associated with gesture control to be able to move outside of the selected region 130, but to prevent interaction with content outside of that region 130 (e.g. via that indicator 26). This might be useful in binding interaction to that region 130, but still allowing the user to have the convenience or intuitive interaction associated with the indicator 26 being able to move outside of that region 130. Or, in an opposite sense, the functionality can be implemented by preventing the indicator 26 from moving outside of the selected region 130, and therefore preventing interaction with content outside of that region 130. This implementation prevents interaction outside of that region, but also intuitively shows to the user that it simply is not possible for such interaction to take place. This might be less confusing than allowing an indicator to extend outside that region but not interact with contents of that region.

An indicator on-screen might not be needed. The prevention of gesture control outside of the selected region could be in general, for example for gestures that are not represented in some way on a display, but which could result in interaction with content on the display.

Figure 15A:
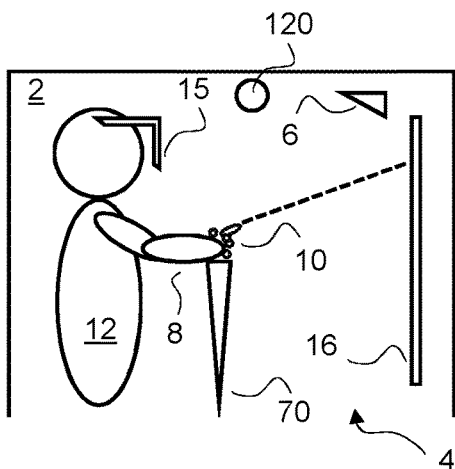
FIGS. 15a and 15b schematically depict a more particular implementation of the interfaces of FIGS. 12a, 13a, 14a, and the respective user views shown in FIGS. 12b, 13b and 14b, in accordance with an example embodiment.
Figure 15B:
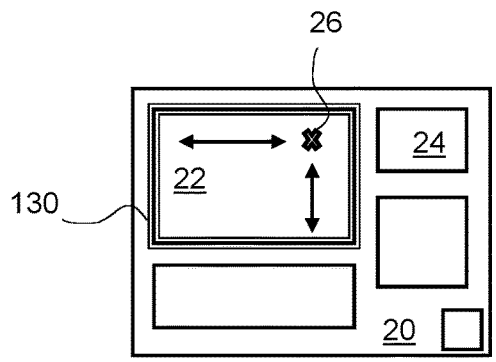

FIGS. 15a and 15b are similar to the situation as shown in relation to FIGS. 10a and 10b, wherein actuator 70 of the vehicle is engaged with in parallel with the use of gesture control. However, in FIGS. 15a and 15b, there is a particular region that has been selected 130 for use with gesture control. This scenario is interesting, in that it demonstrates many advantages of the present embodiment. For instance, the physical range of gesture control may be limited, due to the body part of the user already being engaged with the actuator 70. Nevertheless, the range of possible gesture control may be to some extent expanded by, prior to using gesture control, allowing for a much wider spacial range of selection to be implemented using the selection system 120, for example based on eye-tracking or similar. Alternatively or additionally, this embodiment demonstrates that a particular region, which might comprise a particular area or particular content to be interacted with, may be particularly focussed on and targeted even when movement of those body parts might otherwise have moved a possible point of engagement or interaction beyond an intended point or region. This tying to or restriction of, the gesture control to a particular region means that the user has no worries about accidently or inadvertently engaging with content outside of that region. For instance, the user may initially select a volume control region of a display and subsequently increase or decrease volume using gesture control within that region, being safely aware of the fact that the gesture control will not inadvertently change a speed of the vehicle, or a gear in which the vehicle is in. Or, a user may initially select a communication control region of a display and subsequently communicate with a friendly vehicle using gesture control within that region, being safely aware of the fact that the gesture control will not inadvertently change a nature of engagement with a non-friendly vehicle.

Selection of a region in which the gesture control is to be bound also allows for region specific gesture control to be implemented. For example, the offsetting, or scaling factors, as described above may be made to be dependent on the size of a selected region or the location of a selection region, or the type of content in a selected region. It is therefore entirely possible that outside of that region the same gesture would have a very different output or reaction, or degree of movement, but the initial selection approach described above means that the configuration of the system as a whole can be tailored to the user, or to the vehicle, or to the vehicle interface, by being region-specific.

Figure 15C:
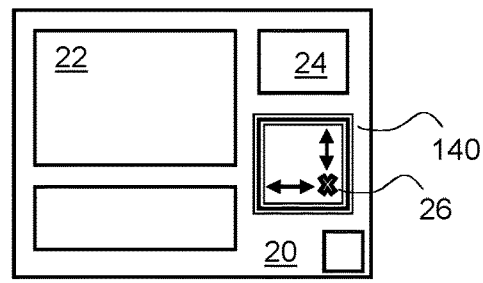

FIG. 15c also demonstrates a further extension of the offset principle discussed above. For example, FIG. 15c shows the same display as FIG. 15b, but with a different selected region of interest 140. Nevertheless, the same general gesture direction as shown in FIG. 15a may be used to control a region 140 that is not actually aligned with the gesture. Again, this increases the functionality of a gesture control, meaning that the gesture does not need to be in alignment with the general direction of the display, or region to be interacted with.

Figure 16A:
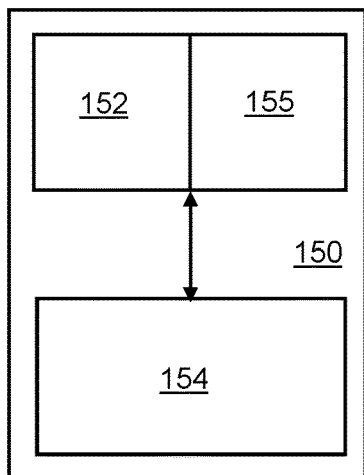
FIG. 16a schematically depicts general apparatus principles associated with a user-vehicle interface according to example embodiments.
Figure 16B:
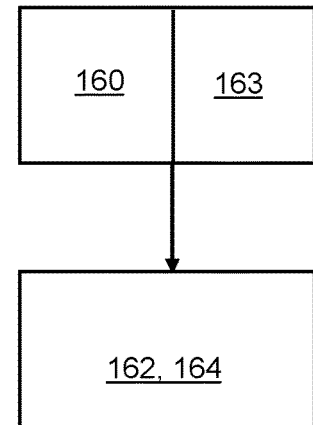
FIG. 16b schematically depicts general methodology of user-vehicle interfacing, according to example embodiments.

FIG. 16a schematically depicts general apparatus-like principles associated with an example embodiment as described above. A user-vehicle interface 150 is shown. The user-vehicle interface comprises a selection system 152, arranged to receive an input from a user of the vehicle, the selection system being arranged to process the input to facilitate interaction with a particular selected region of a display 154, in accordance with that input. A gesture control system 155 is also provided, arranged to sense a gesture of a user, the gesture control system being arranged to process the sensed gesture to control interaction with content on the display 154, in accordance with that sensed gesture. The user-vehicle interface 150 is arranged such that the gesture control interaction with content on the display is only allowed for the particular region of the display 154, as selected by the user Similarly, FIG. 16b depicts general methodology principles associated with the embodiments described above. FIG. 16b shows that the methodology comprises receiving an input 160 from a user of the vehicle and facilitating interaction with a particular selected region of a display 162, in accordance with that input. The method also comprises sensing a gesture of a user of the vehicle 163, and controlling interaction with content on a display, in accordance with that sensed gesture 164. Gesture control interaction 164 with content on the display is only allowed for the particular region of the display, as selected by the user.

As discussed above, it will be appreciated that various different aspects of the present invention can be combined, since they already relate closely to one another in terms of gesture control in a user-vehicle interface. There is a great degree of interplay between the various embodiments and they may of course be used in combination with one another in certain aspects, or in other aspects completely separately.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A user-vehicle interface, comprising:
   a gesture control system comprising a processor in operative communication with a non-transitory storage medium comprising instructions configured to cause the processor to:
   sense a direction of a gesture of a user of the vehicle;
   process the sensed gesture to control a location of an indicator on a display in accordance with that sensed direction, such that a location of the indicator is arranged to move in accordance with changes in the sensed direction, the indicator being used to show a current position for user interaction with content on the display, and being in a plane in which that content resides; and
   process the sensed gesture to control, on the display, a representation of the sensed direction comprising a linear representation, toward the location of the indicator showing the current position for user interaction with the content, either as part of the displayed indicator, or in addition to the displayed indicator,
   wherein movement of the indicator is step-wise, and
   wherein the representation of the sensed direction is configured to appear to the user to originate from a hand or a pointing digit of the hand of the user, outside of the plane in which the content resides.

2. The user-vehicle interface of claim 1, wherein the control is arranged such that the representation of the sensed direction is configured to appear to the user to originate from the general perspective of the user.

3. The user-vehicle interface of claim 1, wherein the control is arranged such that the representation of the sensed direction appears to the user to originate from a general location of a hand or a pointing digit of the hand of the user.

4. The user-vehicle interface of claim 1, wherein the representation of the sensed direction comprises a linear representation.

5. The user-vehicle interface of claim 1, wherein the gesture control system is arranged to sense a direction of the gesture of the user, in the form of a direction of a hand gesture, or in the form of a direction of a point of a digit of the user's hand.

6. The user-vehicle interface of claim 1, wherein the control is such that a location of the indicator is arranged to move in accordance with changes in the sensed direction.

7. The user-vehicle interface of claim 1, wherein the control is such that a location of the indicator is arranged to move in accordance with changes in the sensed direction, according to a scaling factor, such that:
   the scaling factor is substantially 1:1, such that a degree of movement of the indicator substantially equates to a degree of changes in the sensed direction; or
   the scaling factor is X:1, where X is greater than 1, such that a degree of movement of the indicator is greater than a degree of changes in the sensed direction; or
   the scaling factor is 1:X, where X is greater than 1, such that a degree of movement of the indicator is smaller than a degree of changes in the sensed direction.

8. The user-vehicle interface of claim 1, wherein the control is such that a location of the indicator is arranged to be in alignment with the sensed direction.

9. The user-vehicle interface of claim 1, wherein the control is such that a location of the indicator is arranged to be offset from the sensed direction.

10. The user-vehicle interface of claim 1, further comprising an engagement input device for a user to use in order to engage with content coinciding with a location of the indicator.

11. The user-vehicle interface of claim 1, further comprising the display, the display being arranged to be visible to the user of the vehicle, and to display content to the user.

12. The user-vehicle interface of claim 11, wherein the display is:
   a user, head-mounted, display; and/or
   a display that is fixed to or relative to the vehicle.

13. The user-vehicle interface of claim 1, wherein the control is arranged such that the representation of the sensed direction appears to the user to originate from a general location of a body part used in the gesture.

14. A user-vehicle interfacing method, comprising:
   sensing a direction of a gesture of a user of the vehicle; and
   controlling a location of an indicator on a display in accordance with that sensed direction, such that a location of the indicator is arranged to move in accordance with changes in the sensed direction, the indicator being used to show a current position for user interaction with content on the display, and being in a plane in which that content resides; and
   controlling, on the display, a representation of the sensed direction comprising a linear representation, toward the location of the indicator showing the current position for user interaction with the content, either as part of the displayed indicator, or in addition to the displayed indicator,
   wherein movement of the indicator is step-wise, and
   wherein the representation of the sensed direction is configured to appear to the user to originate from a hand or a pointing digit of the hand of the user, outside of the plane in which the content resides.

15. A vehicle, which:
   comprises the user-vehicle interface of claim 1; and
   is configured to implement a user-vehicle interfacing method, the method comprising:
   sensing a direction of a gesture of a user of the vehicle;
   controlling a location of an indicator on a display in accordance with that sensed direction, such that a location of the indicator is arranged to move in accordance with changes in the sensed direction, the indicator being used to show a current position for user interaction with content on the display, and being in a plane in which that content resides; and
   controlling, on the display, a representation of the sensed direction comprising a linear representation, toward the location of the indicator showing the current position for user interaction with the content, either as part of the displayed indicator, or in addition to the displayed indicator, wherein movement of the indicator is step-wise, wherein the representation of the sensed direction is configured to appear to the user to originate from a hand or a pointing digit of the hand of the user, outside of the plane in which the content resides.

16. A user-vehicle interface, comprising:

a gesture control system comprising a processor in operative communication with a non-transitory storage medium comprising instructions configured to cause the processor to:

sense a direction of a gesture of a user of the vehicle;

process the sensed gesture to control a location of an indicator on a display in accordance with that sensed direction, such that a location of the indicator is arranged to move in accordance with changes in the sensed direction, the indicator being used to show a current position for user interaction with content on the display, and being in a plane in which that content resides; and process the sensed gesture to control, on the display, a representation of the sensed direction comprising a linear representation, toward the location of the indicator showing the current position for user interaction with the content, either as part of the displayed indicator, or in addition to the displayed indicator, wherein movement of the indicator is step-wise, and wherein the location of the indicator is limited to a portion of the display, and wherein the representation of the sensed direction is configured to appear to the user to originate from a hand or a pointing digit of the hand of the user, outside of the plane in which the content resides.

17. The user-vehicle interface of claim 16, wherein movement of the indicator is in discrete steps and to snap from one display region to another display region.

18. The user-vehicle interface of claim 17, wherein the indicator is configured to snap from content to content.

19. The user-vehicle interface of claim 17, wherein the indicator is configured to move in discrete steps during periods of sharp movements and/or bouncing and to otherwise move continuously and proportionally in accordance with changes in the sensed direction.

* * * * *